(12) United States Patent
Sun et al.

(10) Patent No.: US 11,340,368 B2
(45) Date of Patent: May 24, 2022

(54) GENERATING A VELOCITY MODEL AND A DENSITY MODEL OF A SUBSURFACE STRUCTURE OF A RESERVOIR

(71) Applicant: Saudi Arabian Oil Company, Dhahran (SA)

(72) Inventors: Yimin Sun, The Hague (NL); Tong Wang Fei, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 519 days.

(21) Appl. No.: 16/360,174

(22) Filed: Mar. 21, 2019

(65) Prior Publication Data
US 2020/0301035 A1    Sep. 24, 2020

(51) Int. Cl.
  *G01V 1/30*    (2006.01)
  *G01V 1/28*    (2006.01)
(52) U.S. Cl.
  CPC .............. *G01V 1/303* (2013.01); *G01V 1/282* (2013.01); *G01V 2210/6222* (2013.01)
(58) Field of Classification Search
  CPC . G01V 1/282; G01V 1/303; G01V 2210/6222
  See application file for complete search history.

(56) References Cited

U.S. PATENT DOCUMENTS

| | | | |
|---|---|---|---|
| 8,542,554 B2 | 9/2013 | Thomson | |
| 9,702,998 B2 | 7/2017 | Bansal | |
| 11,048,001 B2* | 6/2021 | Zhang | G01V 1/282 |
| 2017/0108602 A1 | 4/2017 | Yang et al. | |
| 2018/0196154 A1* | 7/2018 | Gomes | G01V 1/303 |
| 2019/0187312 A1* | 6/2019 | Ramox-Martinez | G01V 1/201 |

OTHER PUBLICATIONS

Zhang et al., "Double parameters full-waveform inversion for velocity and density in the time domain," International Geophysical Conference, Bejing, China, Apr. 24-27, 2018; The Society of Exploration Geophysicists and the Chinese Petroleum Society, 2018, 4 pages.

(Continued)

*Primary Examiner* — Elias Desta
(74) *Attorney, Agent, or Firm* — Fish & Richardson P.C.

(57) ABSTRACT

The present disclosure describes methods and systems, including computer-implemented methods, computer program products, and computer systems, for generating a velocity model and a density model for a subsurface region of a hydrocarbon reservoir. One method includes: receiving, by a data processing apparatus, a set of seismic data of the hydrocarbon reservoir; setting, by the data processing apparatus, an initial velocity model and an initial density model; generating, by the data processing apparatus, wavefields of the hydrocarbon reservoir based on the set of seismic data; selecting, by the data processing apparatus, a spatial direction; generating, by the data processing apparatus, a velocity gradient and a reflectivity gradient of the selected spatial direction based on the wavefields; and updating, by the data processing apparatus, the velocity model and the density model using the velocity gradient and the reflectivity gradient of the selected spatial direction.

15 Claims, 12 Drawing Sheets

(56) References Cited

OTHER PUBLICATIONS

PCT International Search Report and Written Opinion in International Appln. No. PCT/US2020/02355, dated Jul. 10, 2020, 17 pages.
Berkhout, "Review Paper: An outlook on the future of seismic imagining; Part III: Joint Mitigation Inversion," Geophysical Prospecting, 2014, 62: 950-971.
Staal, "Combined imaging and velocity estimation by Joint Migration Inversion," Thesis to obtain the degree of doctor at Delft University of Technology, Nov. 11, 2015, 125 pages.
Verschuur et al., "Joint migration inversion: Simultaneous determination of velocity fields and depth images using all orders of scattering," The Leading Edge, Dec. 2016, 1037-1046.
GCC Examination Report in GCC Appln. No. GC 2020-39408, dated Jul. 26, 2021, 4 pages.

* cited by examiner

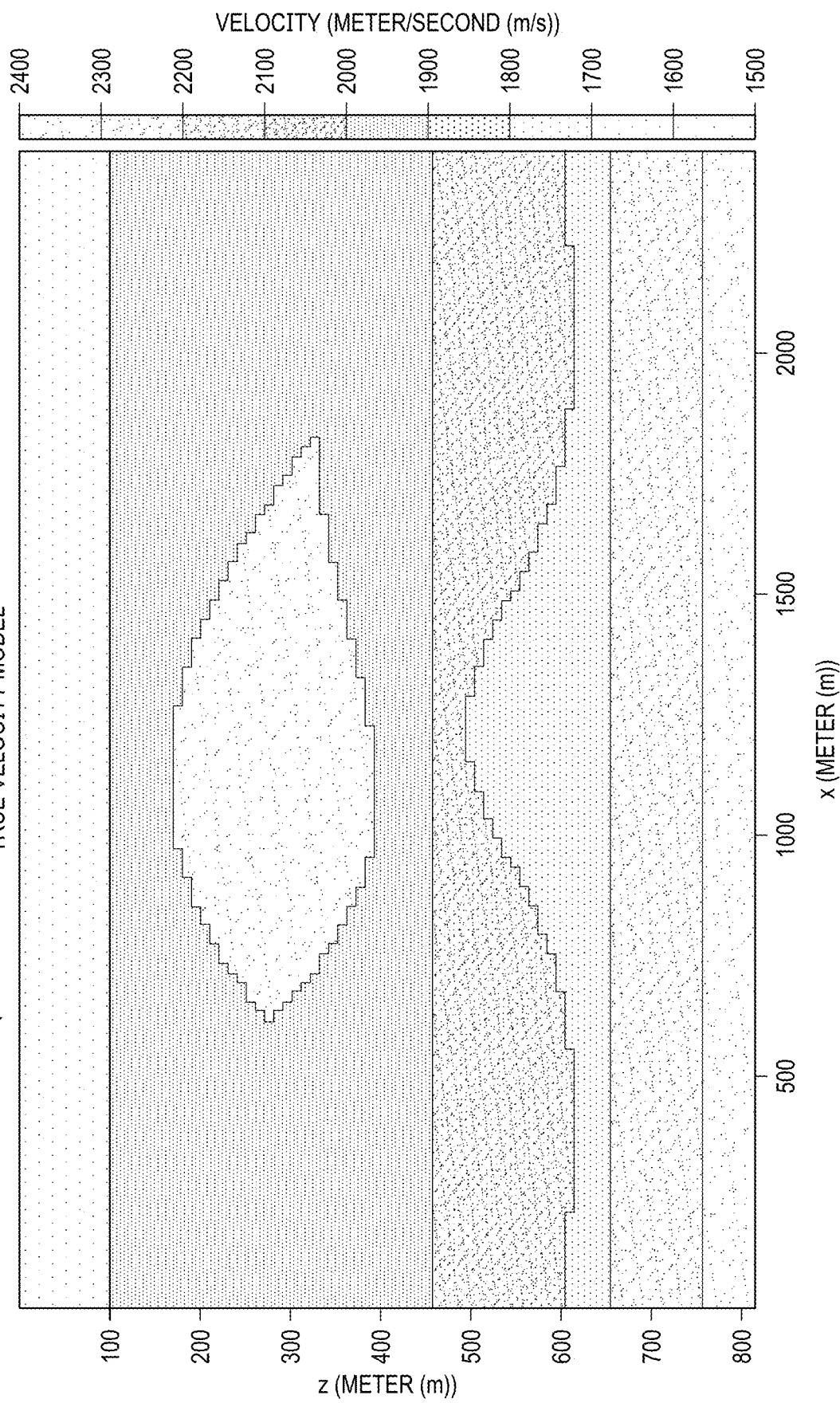

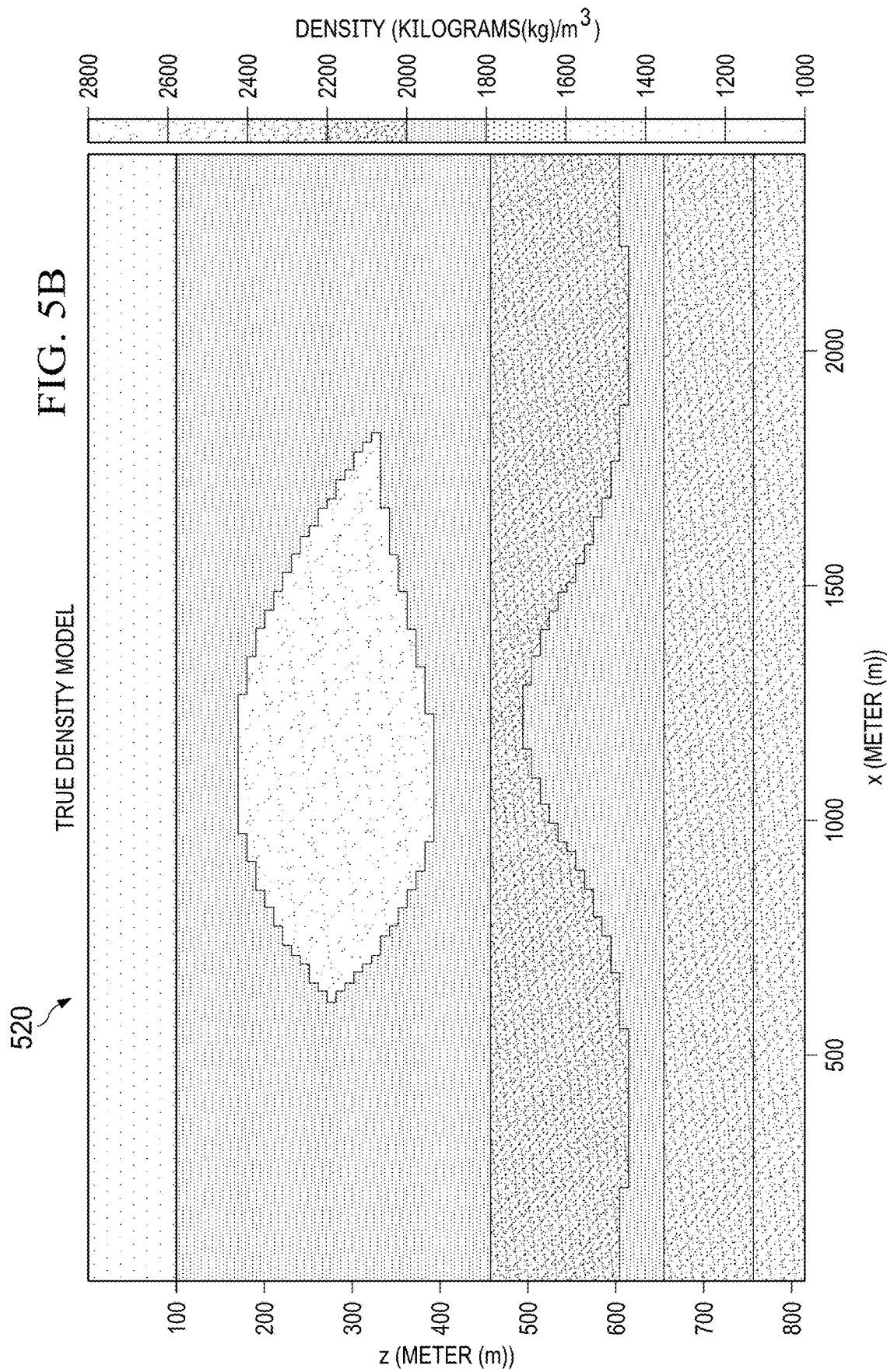

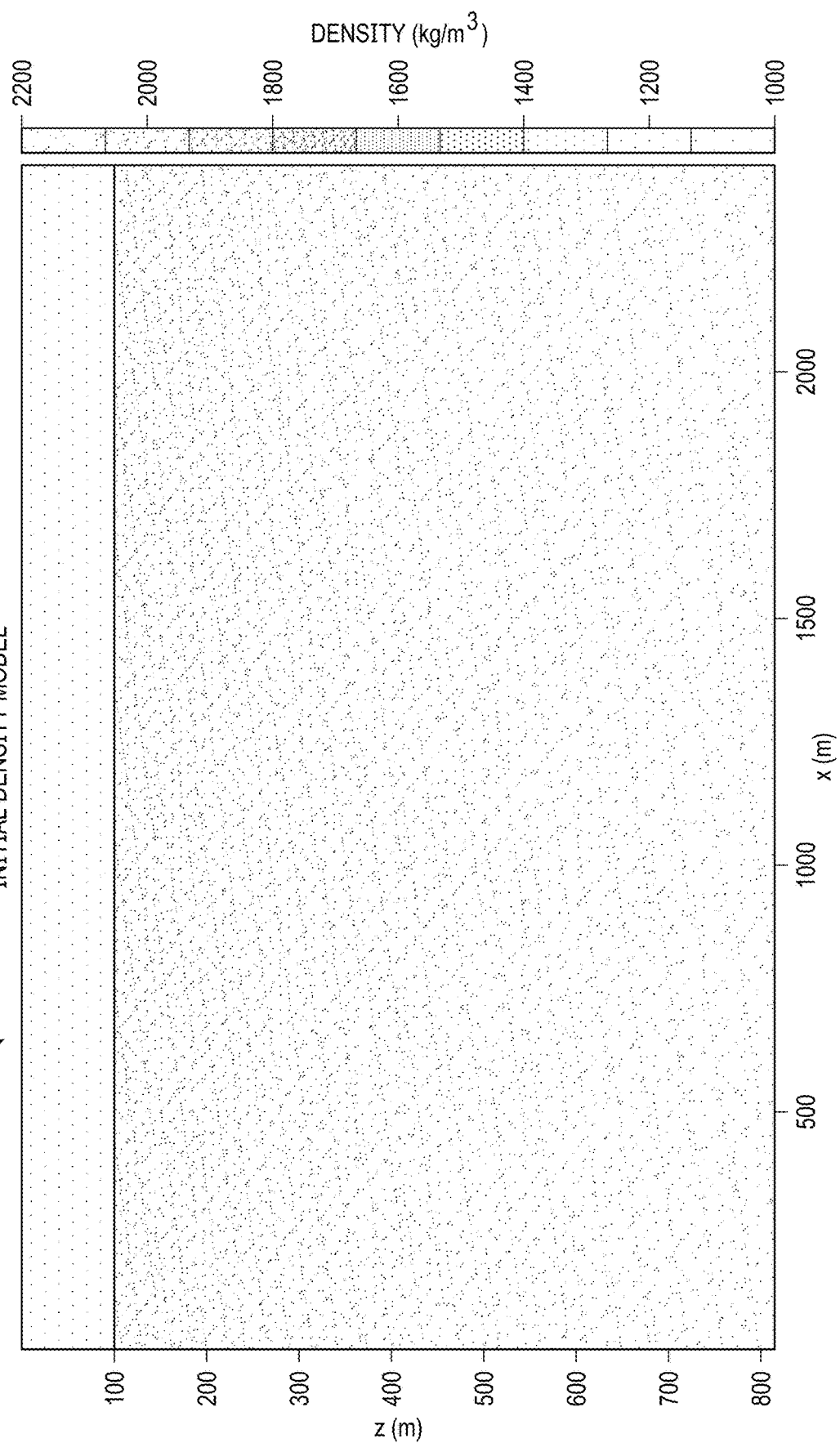

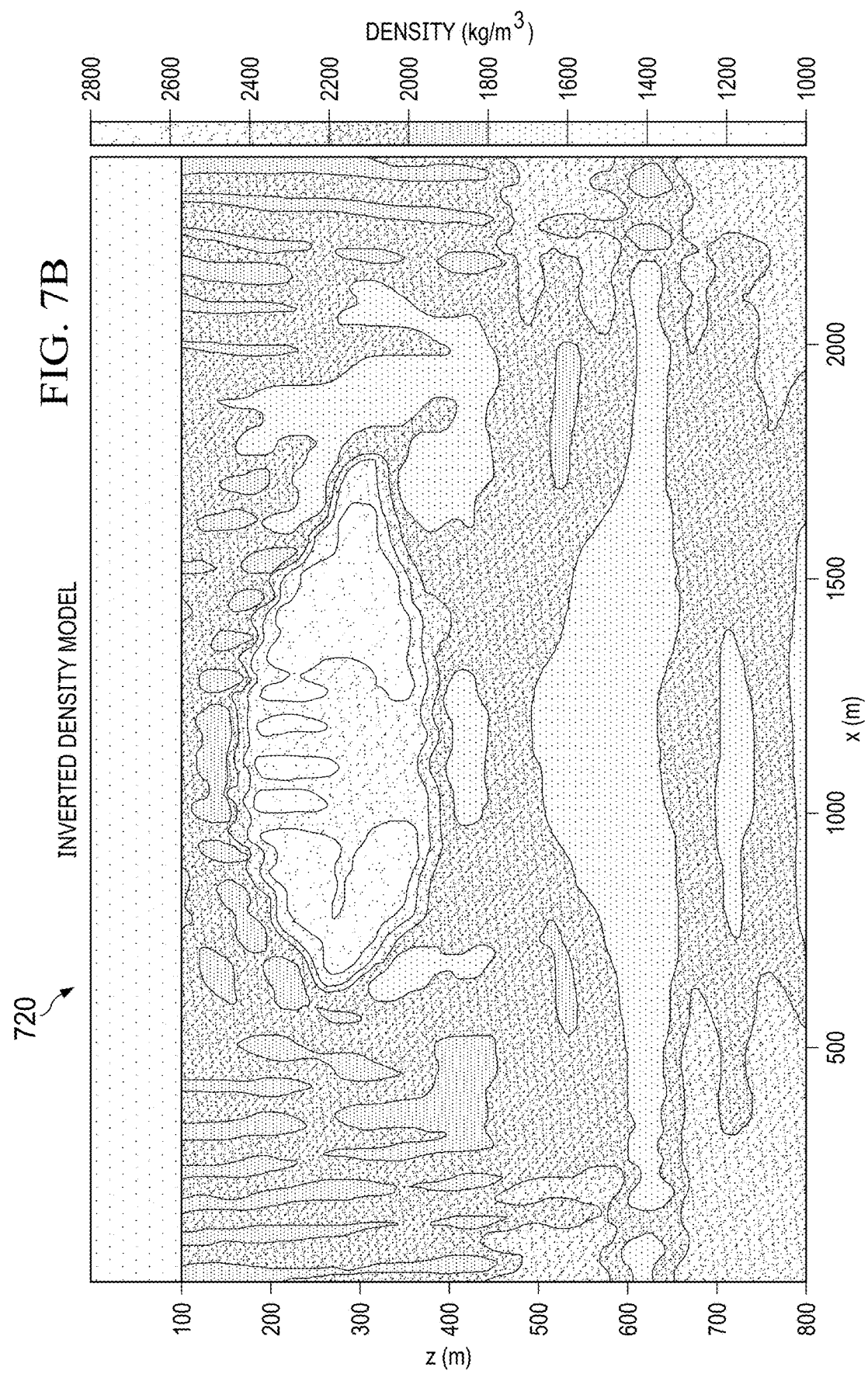

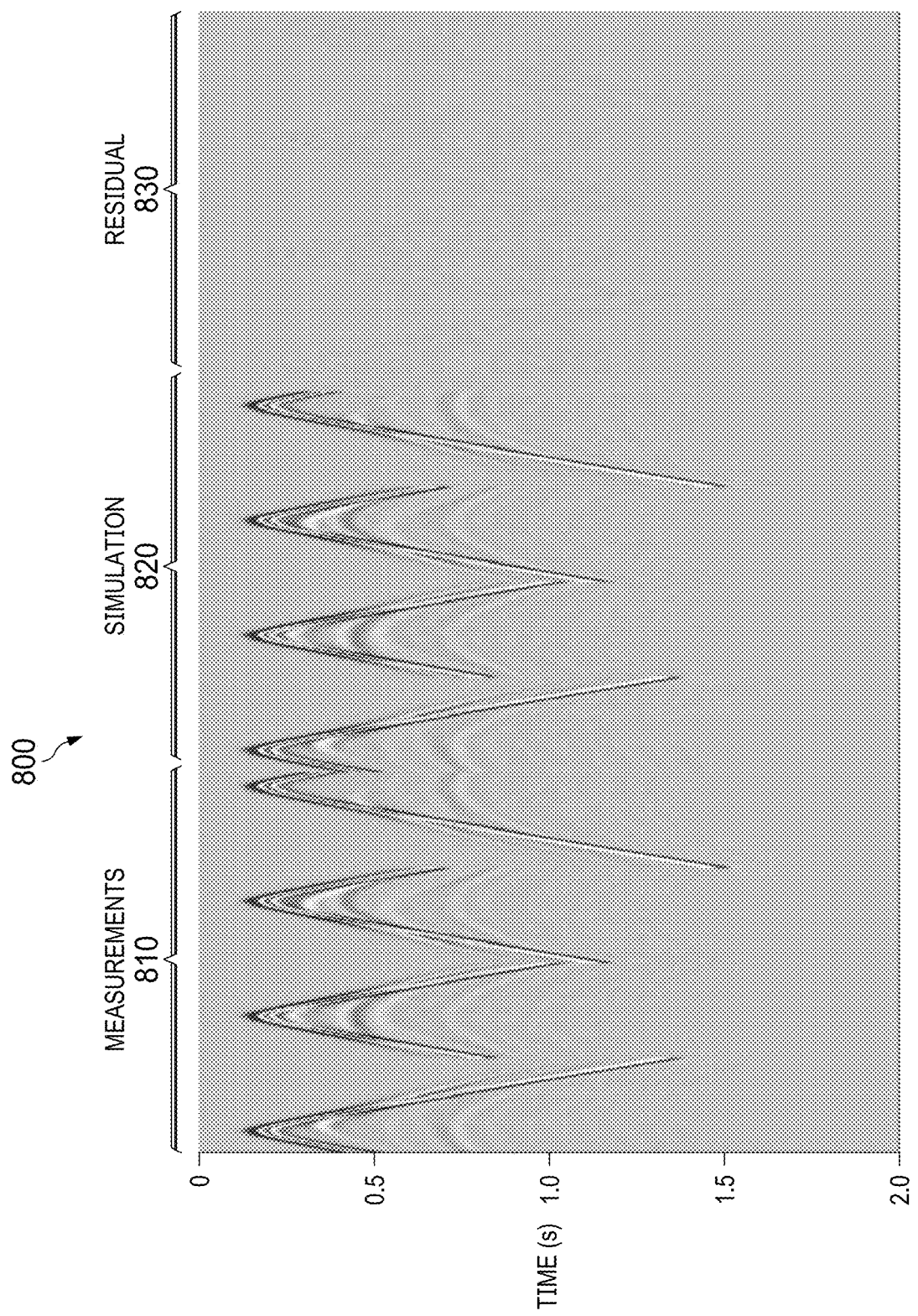

GENERATING A VELOCITY MODEL AND A DENSITY MODEL OF A SUBSURFACE STRUCTURE OF A RESERVOIR

TECHNICAL FIELD

This disclosure relates to generating a velocity model and a density model of a subsurface structure of a reservoir.

BACKGROUND

Developing an accurate velocity model and density model for a subsurface structure of a reservoir are important aspects of geological analysis of the reservoir. Sedimentary rock forms through deposition over time. Layers of rock are created from different materials or under varying conditions. Thus, each layer of rock may have different properties. A velocity model maps out the layers of rock in a geographic region and the expected speed at which seismic waves (for example, P-waves or S-waves) will travel in each layer. A density model maps out the density distribution of rock formations in the geographic region.

SUMMARY

The present disclosure describes methods and systems, including computer-implemented methods, computer program products, and computer systems that can be used for generating a velocity model and a density model. In some implementations, a computer-implemented method for generating a velocity model and a density model includes receiving, by a data processing apparatus, a set of seismic data of the hydrocarbon reservoir; setting, by the data processing apparatus, an initial velocity model and an initial density model; generating, by the data processing apparatus, wavefields of the hydrocarbon reservoir based on the set of seismic data; selecting, by the data processing apparatus, a spatial direction; generating, by the data processing apparatus, a velocity gradient and a reflectivity gradient of the selected spatial direction based on the wavefields; and updating, by the data processing apparatus, the velocity model and the density model using the velocity gradient and the reflectivity gradient of the selected spatial direction.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that, in operation, cause the system to perform the actions. One or more computer programs can be configured to perform particular operations or actions by virtue of including instructions that, when executed by data processing apparatus, cause the apparatus to perform the actions.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 5A and 5B illustrate a synthetic velocity model and a synthetic density model, according to an implementation.

FIGS. 6A and 6B illustrate an initial velocity model and an initial density model, according to an implementation.

FIGS. 7A and 7B illustrate the velocity model and density model obtained based on the process discussed in the disclosure, according to an implementation.

FIG. 8 illustrates an example chart of shot gathers, according to an implementation.

Like reference numbers and designations in the various drawings indicate like elements.

DETAILED DESCRIPTION

Figure 1:
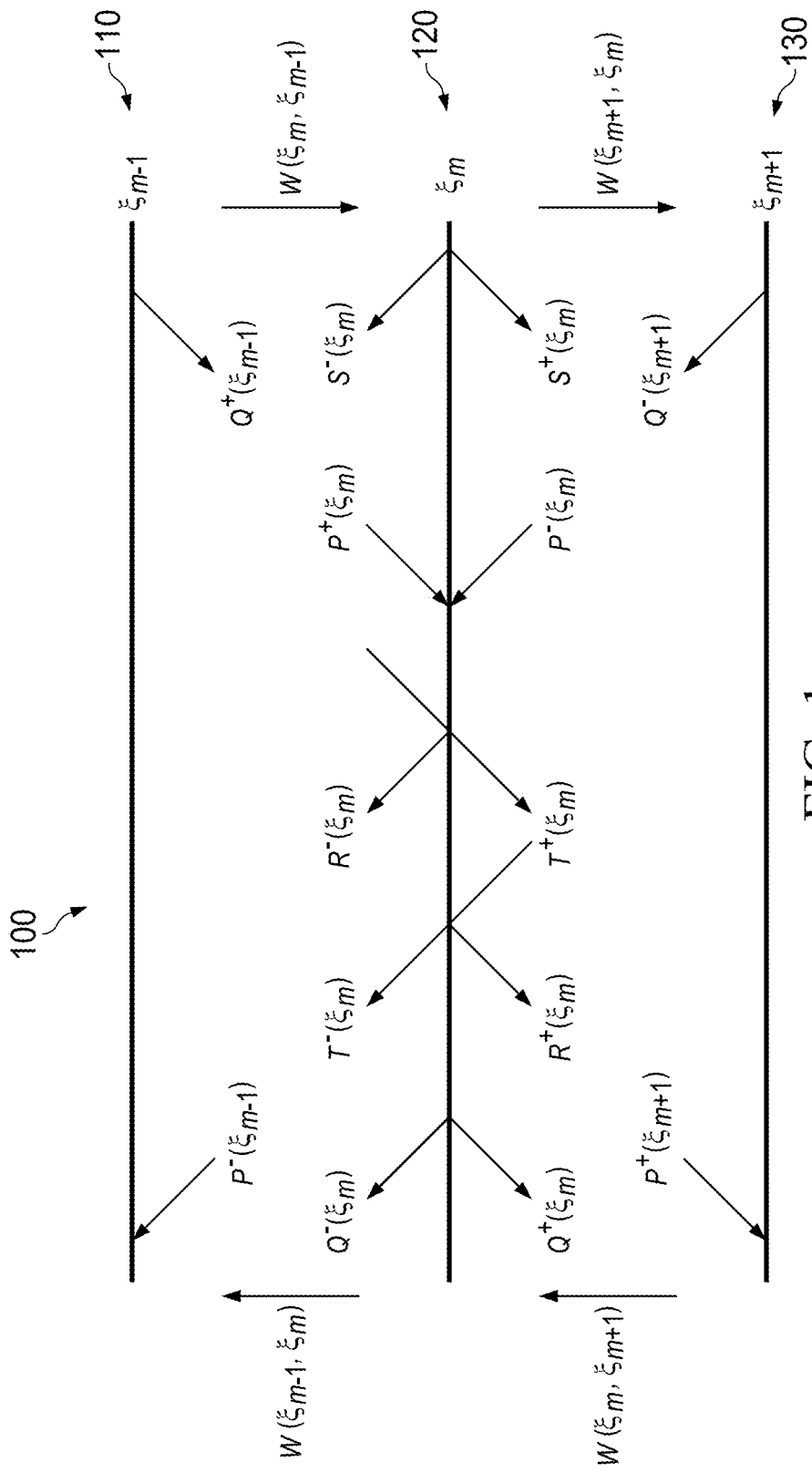
FIG. 1 illustrates an example wavefield propagation model, according to an implementation.

The following detailed description describes techniques for generating a velocity model and a density model. Various modifications, alterations, and permutations of the disclosed implementations can be made and will be readily apparent to those of ordinary skill in the art, and the general principles defined in this disclosure may be applied to other implementations and applications without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the principles and features described in this disclosure.

This disclosure generally describes methods and systems, including computer-implemented methods, computer program products, and computer systems, for generating a velocity model and a density model. The velocity and density models are generated based on seismic data. In some cases, seismic signals can be transmitted into the subsurface of the earth at a source location by a source device. Examples of the seismic signals include acoustic signals. The seismic signals travel through the subsurface and can be received by a receiver device placed at a receiver location. In some cases, the source device, the receiver device, or a combination thereof, can be placed at the surface. The signals can propagate downwards until they reach a reflecting structure and reflect upwards towards the surface. Because the signals have refracted and reflected through the substructure, the characteristics of the received signals contain information of the substructure.

In a marine survey, air guns and hydrophones can be used as the source devices and the receiver devices, respectively. During the acquisition, seismic sources are exploded from arrays of air guns. The reflected and refracted signals are acquired by streamers of hydrophones. In a land acquisition, dynamite can be used as an explosive source and a geophone is employed as a receiver device. In another example, vibratory trucks can be used as source devices. Other devices that generate and receive seismic signals can also be used.

In some cases, the received signal data can include time-domain samples of receiver signal data that are received by a receiver device at the receiver location. For example, during seismic acquisition, a source (dynamite, vibratory truck, air gun array) is activated and the reflections/refractions/transmissions from the subsurface geological boundaries are recorded by the receiver devices that are located on the surface of the Earth. This type of acquisition is repeated for each shot, sequentially or simultaneously, until all the seismic data have been acquired for this survey area. These acquired seismic data are referred to as the receiver signal data. In some cases, the acquired seismic data are collected in the field, transferred to an office (stored and transported via a computer network, a physical network, or a combination thereof), and used as inputs to a computing device to generate the velocity and density models and to produce images of the subsurface structure. The data of the received signals can be referred to as seismic data or measured data.

In some cases, seismic data including the sampled received signals can be collected to build common image gathers (CIGs) or common reflection points (CRPs). In a geophysics analysis, CIGs refer to subsets of the whole image with fixed surface location for measuring variations between the partial images at fixed image points. If the partial images are a function of the reflection angles, the corresponding CIGs are referred to as Common Angle Gathers (CAGs) or Angle Domain Common Image Gathers (ADCIGs).

The CAGs can be used to determine amplitude variation with angle analysis, migration velocity quality control and migration velocity analysis. The process of mapping seismic data onto an image containing the reflective boundaries in the subsurface is referred to as migration. The migration process is developed based on a velocity model and a density model of the subsurface region. When the migration velocity is correct, the images from various incident angles focus on the same depth, thus generating flat events on the CAGs. In contrast, when the velocity has errors, the events in CAGs become non-flat. In addition to the velocity model, the density model can also be used in the migration process. With a correct velocity model and density model, the images of the substructure can be generated based on the collected seismic data.

The solution space of the subsurface region can be divided into multiple layers. The interface between the layers can be characterized by the scalar propagation-angle-independent reflectivities. Velocities can be defined between the layers. FIG. 1 illustrates an example wavefield propagation model 100, according to an implementation. Although the model 100 is shown as 2-dimensional (2D), the model 100 can represent the 3-dimensional (3D) subsurface structure by modeling the acoustic signal propagation direction in 3D vectors. In FIG. 1, $\xi$ represents as an interface between the layers. While FIG. 1 only illustrates three substructure interfaces: interface 110 ($\xi=\xi_{m-1}$), interface 120 ($\xi=\xi_m$), and interface 130 ($\xi=\xi_{m+1}$), additional substructure interfaces can be modeled in similar fashions.

For the interface 120 ($\xi=\xi_m$), there are six different wavefields to be considered: the forward-going incoming wavefield $P^+(\xi_m)$, the backward-going incoming wavefield $P^-(\xi_m)$, the forward-going outgoing wavefield $Q^+(\xi_m)$, the backward-going outgoing wavefield $Q^-(\xi_m)$, the forward-going source wavefield $S^+(\xi_m)$, and the backward-going source wavefield $S^-(\xi_m)$. The forward-going outgoing wavefields $Q^+(\xi_m)$ and the backward-going outgoing wavefield $Q^-(\xi_m)$ can be generated using the wavefield propagation simulation by using the two-way wave equations followed by wavefield separation techniques. Examples of wavefield separation techniques include double-Hilbert transformation and f-k filtering. These wavefields can be represented as vectors that have the same size. In the Fourier domain, for a given frequency, these six wavefields are connected by wavefield propagation, transmission and reflection effects. Following are the two-way wave equations:

$$Q^+(\xi_m)=S^+(\xi_m)+T_\theta^+(\xi_m)*P^+(\xi_m)+R_\theta^+(\xi_m)*P^-(\xi_m), \quad (1)$$

$$Q^-(\xi_m)=S^-(\xi_m)+T_\theta^-(\xi_m)*P^-(\xi_m)+R_\theta^-(\xi_m)*P^+(\xi_m), \quad (2)$$

$$P^+(\xi_m)=W(\xi_m,\xi_{m-1})*Q^+(\xi_{m-1}), \quad (3)$$

$$P^-(\xi_m)=W(\xi_m,\xi_{m+1})*Q^-(\xi_{m+1}), \quad (4)$$

where $T_\theta^+(\xi_m)$ represents the angle-dependent transmission matrix at the interface 120 in the forward-going direction, $R_\theta^+(\xi_m)$ represents the angle-dependent reflection matrix at the interface 120 in the forward-going direction, $T_\theta^-(\xi_m)$ represents the angle-dependent transmission matrix at the interface 120 in the backward-going direction, $R_\theta^-(\xi_m)$ represents the angle-dependent reflection matrix at the interface 120 in the backward-going direction, $W(\xi_m, \xi_{m-1})$ represents the forward propagation matrix constructed from the one-way wave equation between the interfaces 120 and 110, and ($\xi_m, \xi_{m+1}$) represents the forward propagation matrix constructed from the one-way wave equation between the interfaces 120 and 130. Note that the matrices $T^\pm$, $R^\pm$ and W are square matrices, with their column size the same as the size of other vectors in the equations (1) to (4). To reduce the solution space introduced by the angle-dependent transmission and reflection matrices $T^\pm$ and $R^\pm$, equations (1) and (2) can be rewritten in the following equations using angle-independent coefficients:

$$Q^+(\xi_m)=S^+(\xi_m)+T^+(\xi_m).*P^+(\xi_m)+R^+(\xi_m).*P^-(\xi_m), \quad (5)$$

$$Q^-(\xi_m)=S^-(\xi_m)+T^-(\xi_m).*P^-(\xi_m)+R^-(\xi_m).*P^+(\xi_m), \quad (6)$$

where $T^+(\xi_m)$ and $R^+(\xi_m)$ are vectors of the angle-independent transmission and reflection coefficients at the interface 120 in the forward-going direction, respectively, $T^-(\xi_m)$ and $R^-(\xi_m)$ are vectors of the angle-independent transmission and reflection coefficients at the interface 120 in the backward-going direction, respectively, and the symbol ".*" represents an element-wise multiplication of two vectors. In equations (5) and (6), vectors $T^\pm$ and $R^\pm$ have the same size as the other vectors in equations (1) to (4).

$T^+(\xi_m)$, $T^-(\xi_m)$ and $R^+(\xi_m)$ are related to $R^-(\xi_m)$, as shown in the following equations:

$$R^+(\xi_m)=-R^-(\xi_m), \quad (7)$$

$$T^+(\xi_m)=1+R^-(\xi_m), \quad (8)$$

$$T^-(\xi_m)=1-R^-(\xi_m). \quad (9)$$

Based upon equations (5) to (9), the gradient of $r_{m,i}^-$, which denotes the forward-going reflectivity at the i-th location on the interface 120 ($\xi=\xi_m$), can be represented in the following equation:

$$G(r_{m,i}^-)=Re\{(\lambda_{m,i}^-)^H\cdot(p_{m,i}^--p_{m,i}^+)\}+Re\{(\lambda_{m,i}^+)^H\cdot(-p_{m,i}^++p_{m,i}^-)\}, \quad (10)$$

where $G(r_{m,i}^-)$ represents the gradient of $r_{m,i}^-$, Re{a} represents taking the real part of the variable a, $(a)^H$ represents taking the Hermitian conjugate of the variable a, $p_{m,i}^-$ and $p_{m,i}^-$ represents the i-th elements in the vectors $P^-(\xi_m)$ and $P^+(\xi_m)$, respectively.

The gradient of $v_{m,i}$, which denotes the velocity at the i-th location in the layer m, can be represented in the following equation:

$$G(v_{m,i}) = \qquad (11)$$
$$-\text{Re}\left\{(W(\xi_m, \xi_{m+1}) * \Lambda^-(\xi_{m+1}))^H * \frac{\partial W(\xi_m, \xi_{m+1})}{\partial v_i} * Q^-(\xi_{m+1})\right\}$$
$$-\text{Re}\left\{(W(\xi_{m+1}, \xi_m) * \Lambda^+(\xi_m))^H * \frac{\partial W(\xi_{m+1}, \xi_m)}{\partial v_i} * Q^+(\xi_m)\right\}.$$

where $G(v_{m,i})$ represents the gradient of $v_{m,i}$.

Using the local 1-dimensional wavefield propagation assumption, equation (11) can be simplified to:

$$G(v_{m,i}) = -\text{Re}\left\{(\lambda_{m+1,i}^-)^H \cdot j \cdot \frac{\omega}{v_{m,i}^2} \cdot \Delta\xi \cdot q_{m+1,i}^-\right\} - \qquad (12)$$
$$\text{Re}\left\{(\lambda_{m,i}^+)^H \cdot j \cdot \frac{\omega}{v_{m,i}^2} \cdot \Delta\xi \cdot q_{m,i}^+\right\},$$

where $q_{m,i}^-$ and $q_{m,i}^-$ represent the i-th elements in the vectors $Q^-(\xi_m)$ and $Q^+(\xi_m)$, respectively, $\lambda_{m,i}^+$ and $\lambda_{m,i}^-$ represent the i-th elements in the vectors $\Lambda^+(\xi_m)$ and $\Lambda^-(\xi_m)$, respectively. $\Lambda^+(\xi_m)$ and $\Lambda^-(\xi_m)$ represent the forward outgoing wavefields and the backward outgoing wavefields at the interface 120 ($\xi=\xi_m$), respectively. $\Lambda^+(\xi_m)$ and $\Lambda^-(\xi_m)$ can be generated by time-reverse propagation and the forward and backward wavefield separation of the surface data residual.

As described previously, the gradients of velocity and reflectivity can be calculated based on the equations (10) and (12). Furthermore, the solution space can be parameterized based on a velocity model and a density model. An incidence reflectivity r can be represented in the following equation:

$$r = \frac{\rho_{m+1}v_{m+1} - \rho_m v_m}{\rho_{m+1}v_{m+1} + \rho_m v_m}, \qquad (13)$$

where $\rho_m$ and $v_m$ represent the density and velocity at the interface 120 ($\xi=\xi_m$), respectively, and $\rho_{m+1}$ and $v_{m+1}$ represent the density and velocity at the interface 130 ($\xi=\xi_{m+1}$), respectively. Accordingly, the gradient of reflectivity matches the trend of the change of $\rho_{m+1}$ and $v_{m+1}$ if $\rho_m$ and $v_m$ are fixed.

Figure 2:
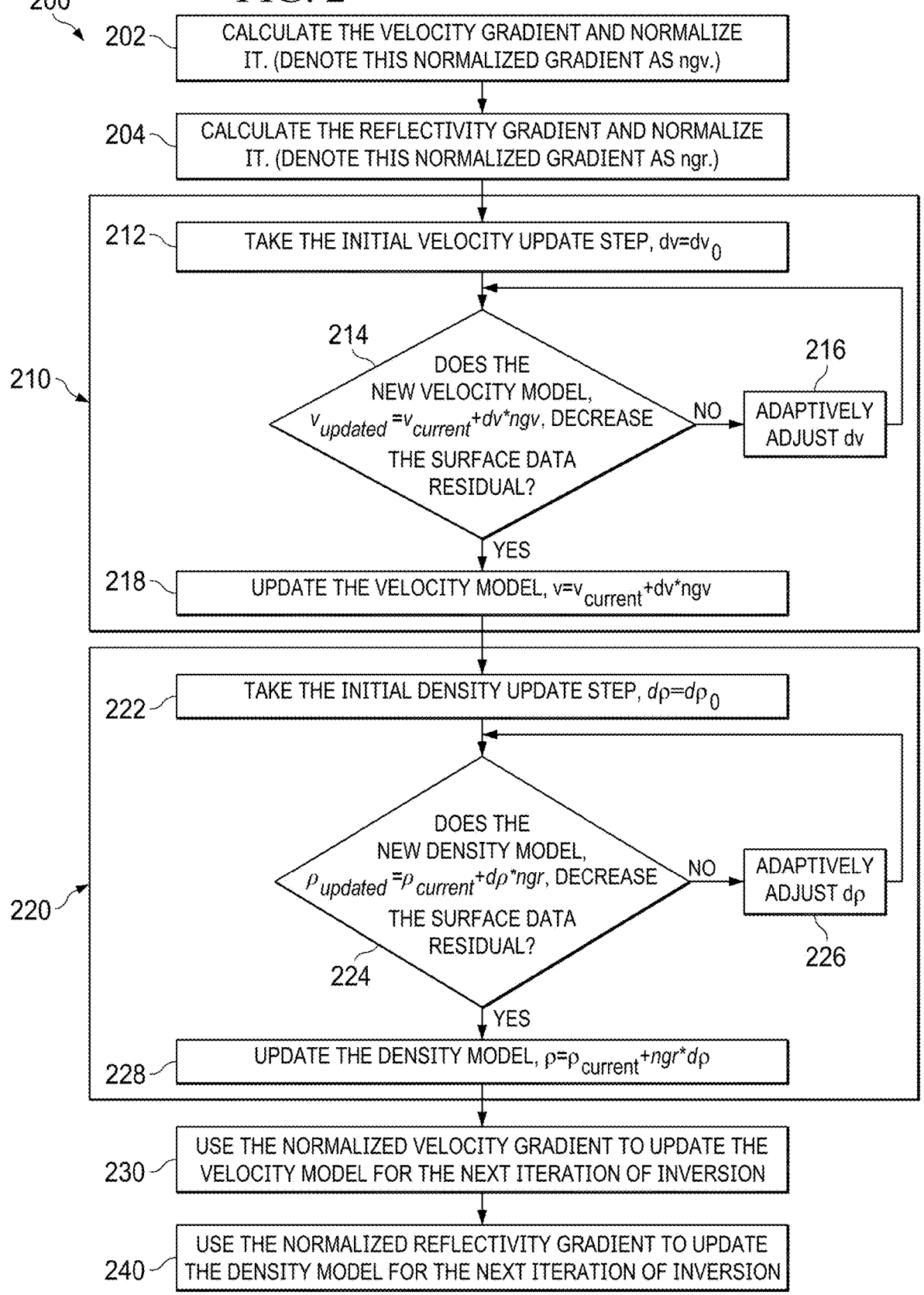
FIG. 2 illustrates an example process of updating the velocity model and density model based on the velocity gradient and reflectivity gradient at one direction, according to an implementation.

The gradients of velocity and density discussed previously are obtained from wavefields propagating in more than one direction. For example, in a 3D space having X, Y, and Z spatial directions, the wavefield separation in equations (5) to (9) can be performed for X, Y, and Z direction separately. Therefore, the velocity gradient and reflectivity gradient for each of these directions can be obtained. The velocity model and density model can be updated using the velocity gradient and the reflectivity gradient for each direction separately. FIG. 2 illustrates an example process 200 of updating the velocity model and density model based on the velocity gradient and reflectivity gradient at one direction, according to an implementation.

At 202, the velocity gradient is calculated using equation (12). The velocity gradient is then normalized within the range [−1, 1]. The normalized velocity gradient is denoted at ngv.

At 204, the reflectivity gradient is calculated using equation (10). The reflectivity gradient is also normalized within the range [−1, 1]. The normalized reflectivity gradient is denoted at ngr.

At 210, the normalized velocity gradient (denoted as ngv), is used to update the velocity model for the subsurface layer above the interface 120 ($\xi=\xi_m$), for example, the subsurface layer between the interface 110 ($\xi=\xi_{m-1}$) and the interface 120 ($\xi=\xi_m$). In the illustrated example, an adaptive step length search process is used. At 212, an initial velocity update step dv is set to $dv_0$. At 214, whether the velocity update step can decrease the surface data residual is determined. A new velocity model $v_{updated}$ is generated based on the current velocity model $v_{current}$ by using the following equation:

$$v_{updated} = v_{current} + dv * ngv \qquad (14)$$

The surface data residual, denoted as $D_s$, represents the difference between the measured data and the simulated data. The measured data, denoted as D, represents the signals received at the receiver devices. The simulated data, denoted as $D_q$, is obtained based on a set of given model, including a velocity model and a density model. Accordingly, $D_s = D - D_q$. The surface data residual that is calculated using the new velocity model $v_{updated}$ is compared with the surface data residual that is calculated using the current velocity model $v_{current}$. If the surface data residual obtained based on the new velocity model is the same as or is greater than the surface data residual obtained based on the previous velocity model, the search process proceeds to 216, where dv is adjusted by using a line search scheme. The search process continues to 214 where the adjusted dv is used to determine whether the new velocity model obtained based on the adjusted dv would decrease the surface data residual. The search process continues until a dv value is found to make the new velocity model decrease the surface data residual. At 218, the updated velocity model is obtained using the found dv value.

At 220, the normalized reflectivity gradient (denoted as ngr), is used to update the density model for the subsurface layer above the interface 120 ($\xi=\xi_m$), for example, the subsurface layer between the interface 110 ($\xi=\xi_{m-1}$) and the interface 120 ($\xi=\xi_m$). In the illustrated example, an adaptive step length search process is used. At 222, an initial reflectivity update step dρ is set to $d\rho_0$. At 224, whether the reflectivity update step can decrease the surface data residual is determined. A new density model $\rho_{updated}$ is generated based on the current density model $\rho_{current}$ by using the following equation:

$$\rho_{updated} = \rho_{current} + d\rho * ngr \qquad (15)$$

The surface data residual that is calculated using the new reflectivity model $p_{updated}$ is compared with the surface data residual that is calculated using the current reflectivity model $p_{current}$. If in the surface data residual obtained based on the new reflectivity model is the same as or is greater than the surface data residual obtained based on the previous reflectivity model, the search process proceeds to 226, where dρ is adjusted by using a line search scheme. The search process continues to 224 where the adjusted dρ is used to determine whether the new reflectivity model obtained based on the adjusted dρ would decrease the surface data residual. The search process continues until a dρ value is found to make the new reflectivity model decrease the surface data residual. At 228, the updated reflectivity model is obtained using the found dρ value.

At 230, the normalized velocity gradient is used to update the velocity model for the next iteration of the inversion. The next iteration of the inversion can be performed for the subsurface layer beneath the interface 120 ($\xi=\xi_m$), for example, the subsurface layer between the interface 120 ($\xi=\xi_m$) and the interface 130 ($\xi=\xi_{m+1}$). The same adaptive step search algorithm used in the step 210 can be used here.

At 240, the normalized reflectivity gradient is used to update the density model for the next iteration of the inversion. The next iteration of the inversion can be performed for the subsurface layer beneath the interface 120 ($\xi=\xi_m$), for example, the subsurface layer between the interface 120 ($\xi=\xi_m$) and the interface 130 ($\xi=\xi_{m+1}$). The same adaptive step search algorithm used in the step 220 can be used here.

The steps in the process 200 can be repeated based on the velocity gradients and reflectivity gradients for other directions. The steps in the process 200 can be repeated for multiple iterations to update the solution space.

Figure 3:
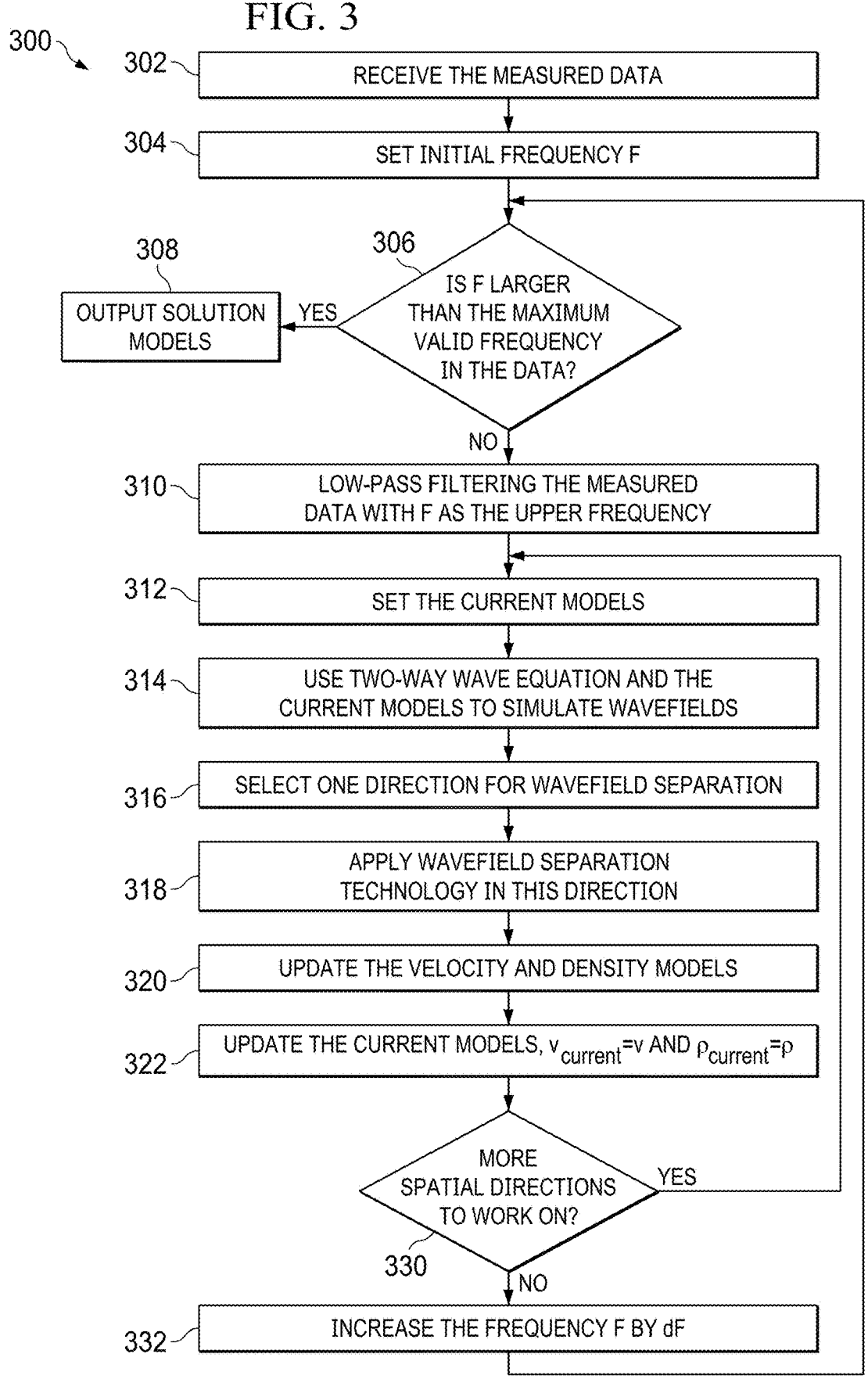
FIG. 3 illustrates an example process of generating the velocity model and density model based on the iterative frequency band, according to an implementation.

The velocity and density model can be updated using an iteration process of adjustable frequency band. The low frequency portion of the measured data is used initially to update the velocity and density model. An iteration process is used to include additional frequency components of the measured data until the full bandwidth of the measured data is used. FIG. 3 illustrates an example process 300 of generating the velocity model and density model based on the iterative frequency band, according to an implementation.

At 302, the measured data of seismic signals is received. The measured data can also be referred to as seismic data. At 304, an initial frequency F is set. In some implementations, a frequency that is less than 5 Hertz (Hz) can be selected as the initial frequency F. For example, the initial frequency F can be set to 2 Hz. At 306, a maximum frequency in the measured data is determined. The maximum frequency can be determined by performing a Fourier transforming the time domain data to the frequency domain. The maximum frequency is determined by selecting the largest frequency that can meet a configured minimum signal to noise ratio criterion based on the frequency domain data. The maximum frequency in the measured data is compared with the initial frequency F. If the maximum frequency is greater than or equal to F, the process 300 continues to 310, where a low-pass filter is used to filter the measured data using F as the upper bound frequency. Accordingly, the frequencies in the filtered measured data are lower than or equal to F.

At 312, the current velocity and density models are set to initial velocity and density models. In some cases, the initial velocity and density model can be chosen based on configured default models, such as a linear gradient model or a homogeneous background model. Alternatively or additionally, the initial velocity and density model can be selected or modified based on additional a priori information. At 314, the two-way wave equation is used with the current velocity and density models to simulate wavefields in the subsurface region. At 316, one direction is selected for wavefield separation. In a 3D space having X, Y, and Z spatial directions, the selected direction can be one of the X, Y, or Z direction. At 318, the selected direction is applied for the wave separation techniques discussed previously to obtain the velocity and reflectivity gradients for the selected direction.

At 320, the velocity and density models are updated using the velocity and reflectivity gradients for the selected direction based on the process 200 discussed previously. At 322, the current velocity and density models are set to the updated model. At 330, whether there are other unselected spatial directions is determined. If there are other unselected directions, the process 300 returns to the step 312. The steps 312 to 330 are repeated until all three spatial directions are processed. After all three spatial directions are processed, the process 300 proceeds to 332, where the frequency F is updated by increasing the initial frequency value by df. In some cases, the df value can be configured by a user or a system administrator. The process 300 returns to 306, where whether the updated frequency F is compared with the maximum frequency in the measured data. The process 300 continues until the updated frequency F is greater than the maximum frequency of the measured data. At this point, the process 300 proceeds to 308, where the velocity and density models are outputted as the solution models.

The velocity and density models obtained according to the process discussed in this disclosure provide accurate characteristics of the subsurface structures. Thus, they can be used to improve the imaging resolution of subsurface structures. In seismic exploration, these improved quality subsurface images can provide a better understanding of the subsurface structure. Thus, the velocity and density models obtained according to the process discussed in this disclosure can be used to direct a hydrocarbon exploration or production operation, and improve the success rate of drilling and reducing geohazards during the production.

Figure 4:
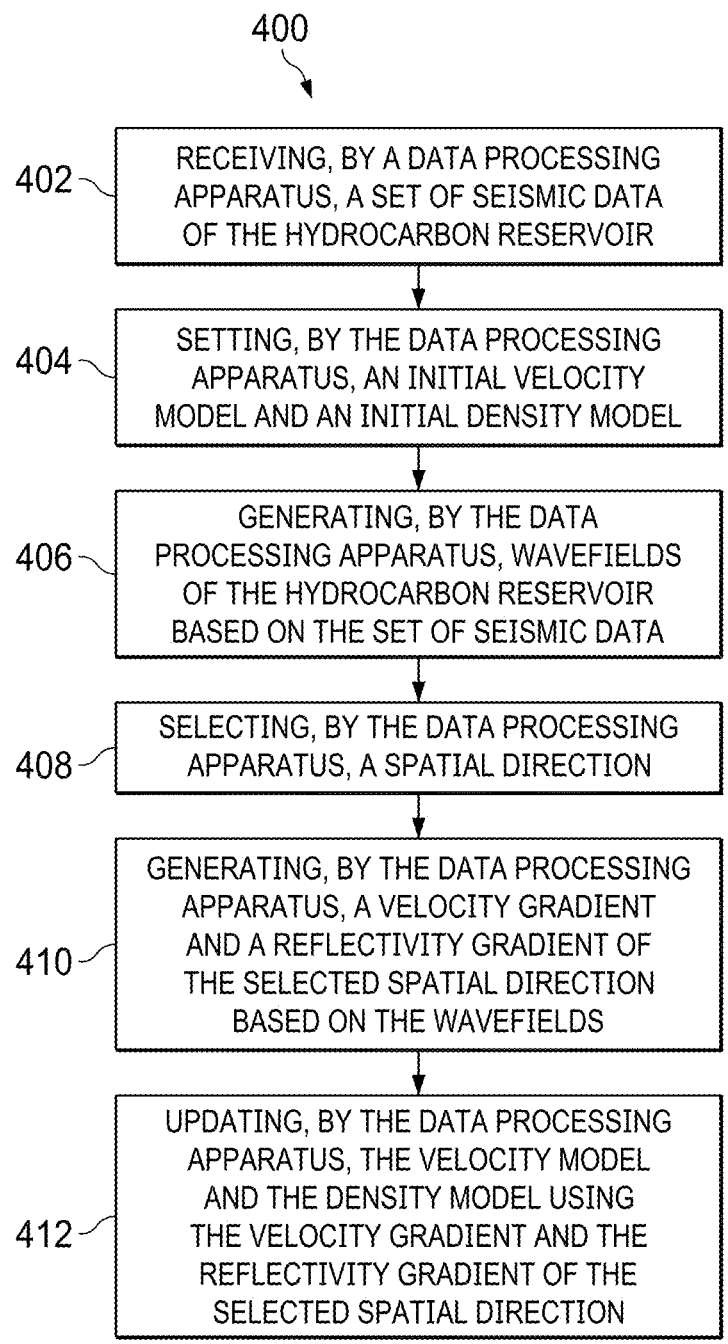
FIG. 4 illustrates an example velocity and density model generating process, according to an implementation.

FIG. 4 illustrates an example velocity and density model generating process 400, according to an implementation. For clarity of presentation, the description that follows generally describes process 400 in the context of FIGS. 1-3 and 5A-9. However, it will be understood that process 400 may be performed, for example, by any other suitable system, environment, software, and hardware, or a combination of systems, environments, software, and hardware, as appropriate. In some cases, the process 400 can be executed on a computer cluster, super computers, or any other computing device or collection of computing devices. In some implementations, various steps of process 400 can be run in parallel, in combination, in loops, or in any order.

At 402, a data processing apparatus receives a set of seismic data of the hydrocarbon reservoir. At 404, the data processing apparatus sets an initial velocity model and an initial density model. At 406, the data processing apparatus generates wavefields of the hydrocarbon reservoir based on the set of seismic data. At 408, the data processing apparatus selects a spatial direction. At 410, the data processing apparatus generates a velocity gradient and a reflectivity gradient of the selected spatial direction based on the wavefields. At 412, the data processing apparatus updates the velocity model and the density model using the velocity gradient and the reflectivity gradient of the selected spatial direction.

Figure 6A:
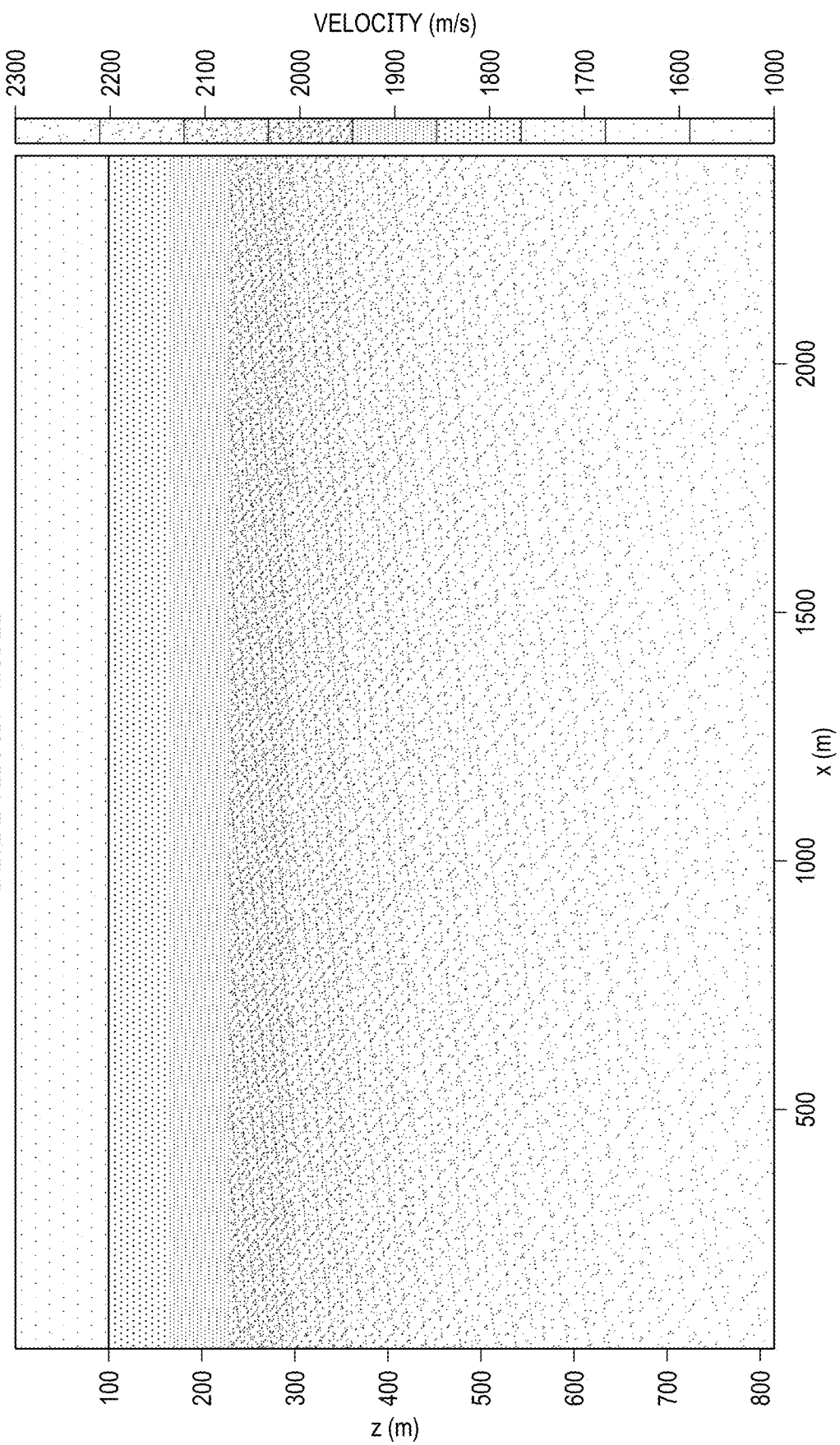
Figure 7A:
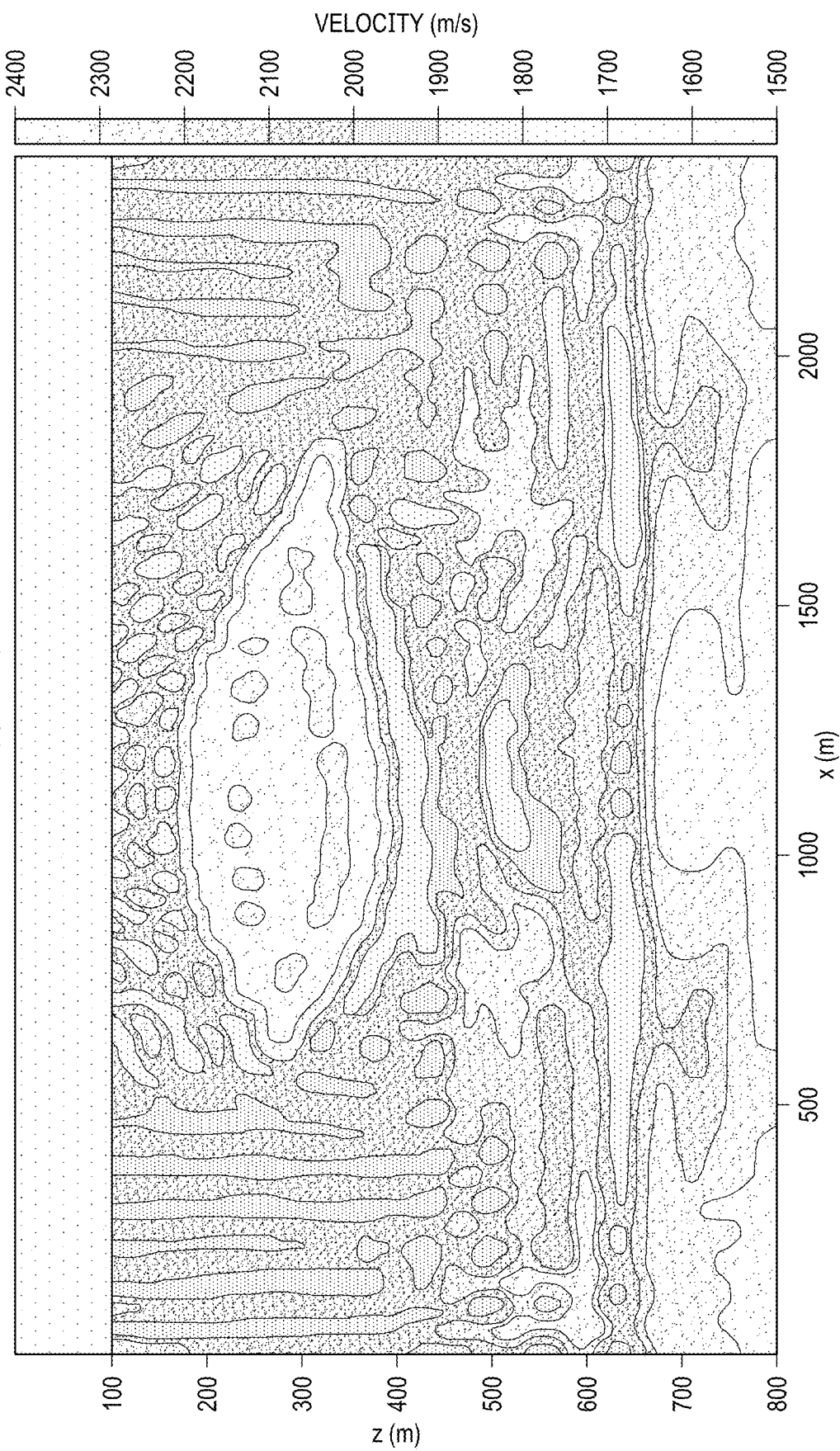

A simulation based on a 2-dimensional (2D) synthetic example is used to illustrate the effect of the modeling process discussed in this disclosure. In the simulation, the source depth is 5 m, and a Ricker wavelet with a dominant frequency of 10 Hertz (Hz) is used as the source wavelet. In the lateral direction, the source location begins at 100 m and ends at 2300 m with a spacing of 50 m, which results in 45 shot gathers. The receiver geometry is the same for all shot gathers: the receiver depth is 10 m, and in the lateral direction receivers cover the range of [0, 2400 m] with a spacing of 25 m. The maximum inversion frequency is set to 30 Hz in the inversion plan. The initial frequency F, as in the process 300, is set to F=2 Hz, and the maximum frequency is 30 Hz. Because this is a 2D sample, two directions (Z direction and X direction) are selected to update the models during the inversion. FIGS. 5A and 5B illustrate the velocity model 510 and a density model 520 of the synthetic example, according to an implementation. FIGS. 6A and 6B illustrate an initial velocity model 610 and an initial density model 620, according to an implementation. FIGS. 7A and 7B illustrate the inverted velocity model 710 and inverted density model 720 obtained based on the process discussed in the disclosure, according to an implementation.

FIG. 8 illustrates an example chart 800 of shot gathers, according to an implementation. The chart includes the shot gathers in section 810, which represent the measured data, and the shot gathers in section 820, which represent the simulated data based on the obtained velocity and density model. The obtained velocity and density models provide an accurate result. Accordingly, the shot gathers in section 830, which represent the data residual, are weak.

Figure 9:
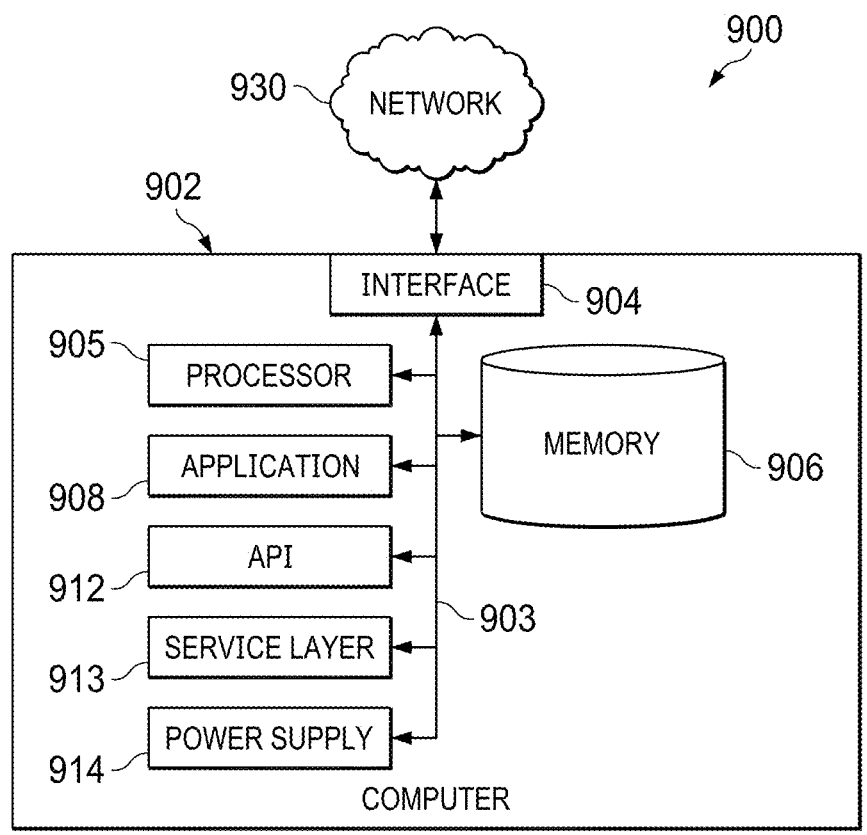
FIG. 9 is a block diagram illustrating an example computer system used to provide computational functionalities associated with described algorithms, methods, functions, processes, flows, and procedures as described in the present disclosure, according to some implementations.

FIG. 9 is a block diagram illustrating an example computer system 900 used to provide computational functionalities associated with described algorithms, methods, functions, processes, flows, and procedures as described in the present disclosure, according to some implementations. The illustrated system 900 includes a computer 902 coupled with a network 930.

The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 930 facilitates communication between the computer 902 and other components, for example, components that obtain observed data for a location and transmit the observed data to the computer 902. The network 930 can be a wireless or a wireline network. The network 930 can also be a memory pipe, a hardware connection, or any internal or external communication paths between the components.

The computer 902 includes a computing system configured to perform the method as described in this disclosure. For example, the computer 902 can be used to implement the processes illustrated in FIGS. 2-4. In some cases, the algorithm of the method can be implemented in an executable computing code, for example, C/C++ executable codes. In some cases, the computer 902 can include a standalone LINUX system that runs batch applications. In some cases, the computer 902 can include mobile or personal computers.

The computer 902 encompasses any computing device such as a server, a desktop computer, a laptop/notebook computer, a personal data assistant (PDA), a tablet computing device, or one or more processors within these devices, including physical instances, virtual instances, or both. The computer 902 can include input devices, such as keypads, keyboards, touch screens, microphones, speech recognition devices, and other devices that can accept user information. The computer 902 can include output devices that can convey information associated with the operation of the computer 902. The information can include digital data, visual data, or audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both) over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a memory 906 that can hold data for the computer 902 or a combination of components connected to the network 930 (whether illustrated or not). Memory 906 can store any data consistent with the present disclosure. In some implementations, memory 906 can be a combination of two or more different types of memory (for example, a combination of semiconductor and magnetic storage) according to particular needs, desires, or particular implementations of the computer 902 and the described functionality. Although illustrated as a single memory 906 in FIG. 9, two or more memories 906 (of the same, different, or combination of types) can be used according to particular needs, desires, or particular implementations of the computer 902 and the described functionality. While memory 906 is illustrated as an internal component of the computer 902, in alternative implementations, memory 906 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method for generating a velocity and density model to obtain an image of a subsurface structure in a hydrocarbon reservoir includes: receiving, by a data processing apparatus, a set of seismic data of the hydrocarbon reservoir; setting, by the data processing apparatus, an initial velocity model and an initial density model; generating, by the data processing apparatus, wavefields of the hydrocarbon reservoir based on the set of seismic data; selecting, by the data processing apparatus, a spatial direction; generating, by the data processing apparatus, a velocity gradient and a reflectivity gradient of the selected spatial direction based on the wavefields; and updating, by the data processing apparatus, the velocity model and the density model using the velocity gradient and the reflectivity gradient of the selected spatial direction.

The foregoing and other described implementations can each, optionally, include one or more of the following features, alone or in combination:

A first feature, combinable with the general implementation and any of the following features, where the method further includes: selecting a second spatial direction; generating, by the data processing apparatus, a second velocity gradient and a second reflectivity gradient of the second spatial direction; and updating, the velocity model and the density model using the second velocity gradient and the second reflectivity gradient.

A second feature, combinable with any of the previous or following features, where the updating the velocity model and the density model includes: using a first iterative process to update the velocity model, where the first iterative process includes a first plurality of iterations, each of the first plurality of iterations includes generating a velocity update step value, generating an updated velocity model based on the velocity update step value and the velocity gradient, and in each of the first plurality of iterations, the initial velocity model is replaced by the updated velocity model generated in a previous iteration; and using a second iterative process to update the density model, where the second iterative process includes a second plurality of iterations, each of the second plurality of iterations includes generating a density update step value, generating a updated density model based on the density update step value and the reflectivity gradient, and in each of the second plurality of iterations, the initial density model is replaced by the updated density model generated in a previous iteration.

A third feature, combinable with any of the previous or following features, where the first iterative process terminates when the update velocity model does not decrease a first surface data residual, and the second iterative process terminates when the update density model does not decrease a second surface data residual.

A fourth feature, combinable with any of the previous or following features, where the method further includes: filtering the set of seismic data using a low-pass filter based on an initial frequency; and where the wavefields of the hydrocarbon reservoir are generated by using the filtered set of seismic data.

A fifth feature, combinable with any of the previous or following features, where the method further includes: using an iterative process to update the velocity model and the density model, where the iterative process includes a plurality of iterations, each of the plurality of iterations includes generating a frequency step value, generating an updated frequency based on the frequency step value, and filtering the set of seismic data based on the updated frequency to generate an updated velocity gradient and an updated reflectivity gradient, and using the updated velocity gradient and the updated reflectivity gradient to update the velocity model and the density model.

A sixth feature, combinable with any of the previous or following features, where the iterative process terminates when the update frequency is greater than a maximum frequency in the set of seismic data.

In a second implementation, a non-transitory computer-readable medium storing instructions which, when executed, cause a computer system to perform operations including: receiving, by a data processing apparatus, a set of seismic data of the hydrocarbon reservoir; setting, by the data processing apparatus, an initial velocity model and an initial density model; generating, by the data processing apparatus, wavefields of the hydrocarbon reservoir based on the set of seismic data; selecting, by the data processing apparatus, a spatial direction; generating, by the data processing apparatus, a velocity gradient and a reflectivity gradient of the selected spatial direction based on the wavefields; and updating, by the data processing apparatus, the velocity model and the density model using the velocity gradient and the reflectivity gradient of the selected spatial direction.

The foregoing and other described implementations can each, optionally, include one or more of the following features, alone or in combination:

A first feature, combinable with the general implementation and any of the following features, where the operations further include: selecting a second spatial direction; generating, by the data processing apparatus, a second velocity gradient and a second reflectivity gradient of the second spatial direction; and updating, the velocity model and the density model using the second velocity gradient and the second reflectivity gradient.

A second feature, combinable with any of the previous or following features, where the updating the velocity model and the density model includes: using a first iterative process to update the velocity model, where the first iterative process includes a first plurality of iterations, each of the first plurality of iterations includes generating a velocity update step value, generating an updated velocity model based on the velocity update step value and the velocity gradient, and in each of the first plurality of iterations, the initial velocity model is replaced by the updated velocity model generated in a previous iteration; and using a second iterative process to update the density model, where the second iterative process includes a second plurality of iterations, each of the second plurality of iterations includes generating a density update step value, generating a updated density model based on the density update step value and the reflectivity gradient, and in each of the second plurality of iterations, the initial density model is replaced by the updated density model generated in a previous iteration.

A third feature, combinable with any of the previous or following features, where the first iterative process terminates when the update velocity model does not decrease a first surface data residual, and the second iterative process terminates when the update density model does not decrease a second surface data residual.

A fourth feature, combinable with any of the previous or following features, where the operations further include: filtering the set of seismic data using a low-pass filter based on an initial frequency; and where the wavefields of the hydrocarbon reservoir are generated by using the filtered set of seismic data.

A fifth feature, combinable with any of the previous or following features, where the operations further include: using an iterative process to update the velocity model and the density model, where the iterative process includes a plurality of iterations, each of the plurality of iterations includes generating a frequency step value, generating an updated frequency based on the frequency step value, and filtering the set of seismic data based on the updated frequency to generate an updated velocity gradient and an updated reflectivity gradient, and using the updated velocity gradient and the updated reflectivity gradient to update the velocity model and the density model.

A sixth feature, combinable with any of the previous or following features, where the iterative process terminates when the update frequency is greater than a maximum frequency in the set of seismic data.

In a third implementation, a device includes: at least one hardware processor; and a non-transitory computer-readable storage medium coupled to the at least one hardware processor and storing programming instructions for execution by the at least one hardware processor, wherein the programming instructions, when executed, cause the at least one hardware processor to perform operations including: receiving a set of seismic data of a hydrocarbon reservoir; setting an initial velocity model and an initial density model; generating wavefields of the hydrocarbon reservoir based on the set of seismic data; selecting a spatial direction; generating a velocity gradient and a reflectivity gradient of the selected spatial direction based on the wavefields; and updating a velocity model and a density model using the velocity gradient and the reflectivity gradient of the selected spatial direction.

The foregoing and other described implementations can each, optionally, include one or more of the following features, alone or in combination:

A first feature, combinable with the general implementation and any of the following features, where the operations further include: selecting a second spatial direction; generating a second velocity gradient and a second reflectivity gradient of the second spatial direction; and updating, the velocity model and the density model using the second velocity gradient and the second reflectivity gradient.

A second feature, combinable with any of the previous or following features, where the updating the velocity model and the density model includes: using a first iterative process to update the velocity model, where the first iterative process includes a first plurality of iterations, each of the first plurality of iterations includes generating a velocity update step value, generating an updated velocity model based on the velocity update step value and the velocity gradient, and in each of the first plurality of iterations, the initial velocity model is replaced by the updated velocity model generated in a previous iteration; and using a second iterative process to update the density model, where the second iterative process includes a second plurality of iterations, each of the second plurality of iterations includes generating a density update step value, generating a updated density model based on the density update step value and the reflectivity gradient, and in each of the second plurality of iterations, the initial density model is replaced by the updated density model generated in a previous iteration.

A third feature, combinable with any of the previous or following features, where the first iterative process terminates when the update velocity model does not decrease a first surface data residual, and the second iterative process terminates when the update density model does not decrease a second surface data residual.

A fourth feature, combinable with any of the previous or following features, where the operations further include: filtering the set of seismic data using a low-pass filter based on an initial frequency; and where the wavefields of the hydrocarbon reservoir are generated by using the filtered set of seismic data.

A fifth feature, combinable with any of the previous or following features, where the operations further include:

using an iterative process to update the velocity model and the density model, where the iterative process includes a plurality of iterations, each of the plurality of iterations includes generating a frequency step value, generating an updated frequency based on the frequency step value, and filtering the set of seismic data based on the updated frequency to generate an updated velocity gradient and an updated reflectivity gradient, and using the updated velocity gradient and the updated reflectivity gradient to update the velocity model and the density model.

A sixth feature, combinable with any of the previous or following features, where the iterative process terminates when the update frequency is greater than a maximum frequency in the set of seismic data.

In some implementations, the described methodology can be configured to send messages, instructions, or other communications to a computer-implemented controller, database, or other computer-implemented system to dynamically initiate control of, control, or cause another computer-implemented system to perform a computer-implemented operation. For example, operations based on data, operations, outputs, or interaction with a GUI can be transmitted to cause operations associated with a computer, database, network, or other computer-based system to perform storage efficiency, data retrieval, or other operations consistent with this disclosure. In another example, interacting with any illustrated GUI can automatically result in one or more instructions transmitted from the GUI to trigger requests for data, storage of data, analysis of data, or other operations consistent with this disclosure.

In some instances, transmitted instructions can result in control, operation, modification, enhancement, or other operations with respect to a tangible, real-world piece of computing or other equipment. For example, the described GUIs can send a request to slow or speed up a computer database magnetic/optical disk drive, activate/deactivate a computing system, cause a network interface device to disable, throttle, or increase data bandwidth allowed across a network connection, or sound an audible/visual alarm (such as a mechanical alarm/light emitting device) as a notification of a result, behavior, determination, or analysis with respect to a computing system(s) associated with the described methodology or interacting with the computing system(s) associated with the described methodology.

In some implementations, the output of the described methodology can be used to dynamically influence, direct, control, influence, or manage tangible, real-world equipment related to hydrocarbon production, analysis, and recovery or for other purposes consistent with this disclosure. For example, data relating to processed seismic data can be used to enhance quality of produced seismic/structural images or for use in other analytical/predictive processes. As another example, the data relating to processed seismic data can be used to modify a wellbore trajectory, increase/decrease speed of or stop/start a hydrocarbon drill; activate/deactivate an alarm (such as, a visual, auditory, or voice alarm), or to affect refinery or pumping operations (for example, stop, restart, accelerate, or reduce). Other examples can include alerting geo-steering and directional drilling staff when underground obstacles have been detected (such as with a visual, auditory, or voice alarm). In some implementations, the described methodology can be integrated as part of a dynamic computer-implemented control system to control, influence, or use with any hydrocarbon-related or other tangible, real-world equipment consistent with this disclosure.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for generating a velocity model and a density model to obtain an image of a subsurface structure in a hydrocarbon reservoir, comprising:
    receiving, by a data processing apparatus, a set of seismic data of the hydrocarbon reservoir;
    setting, by the data processing apparatus, an initial velocity model and an initial density model;
    filtering the set of seismic data using a low-pass filter based on an initial frequency;
    generating, by the data processing apparatus, wavefields of the hydrocarbon reservoir by using the filtered set of seismic data;
    selecting, by the data processing apparatus, a spatial direction;
    generating, by the data processing apparatus, a velocity gradient and a reflectivity gradient of the selected spatial direction based on the wavefields;
    updating, by the data processing apparatus, the velocity model and the density model using the velocity gradient and the reflectivity gradient of the selected spatial direction; and
    using an iterative process to update the velocity model and the density model, wherein the iterative process comprises a plurality of iterations, each of the plurality of iterations comprises generating an updated frequency based on a frequency step value and a previous frequency, and filtering the set of seismic data based on the updated frequency to generate an updated velocity gradient and an updated reflectivity gradient, and using the updated velocity gradient and the updated reflectivity gradient to update the velocity model and the density model.

2. The method of claim 1, further comprising:
    selecting a second spatial direction;
    generating, by the data processing apparatus, a second velocity gradient and a second reflectivity gradient of the second spatial direction; and
    updating, the velocity model and the density model using the second velocity gradient and the second reflectivity gradient.

3. The method of claim 1, wherein the updating the velocity model and the density model comprises:
    using a first iterative process to update the velocity model, wherein the first iterative process comprises a first plurality of iterations, each of the first plurality of iterations comprises generating a velocity update step value, generating an updated velocity model based on the velocity update step value and the velocity gradient, and in each of the first plurality of iterations, the initial velocity model is replaced by the updated velocity model generated in a previous iteration; and
    using a second iterative process to update the density model, wherein the second iterative process comprises a second plurality of iterations, each of the second plurality of iterations comprises generating a density update step value, generating a updated density model based on the density update step value and the reflectivity gradient, and in each of the second plurality of iterations, the initial density model is replaced by the updated density model generated in a previous iteration.

4. The method of claim 3, wherein the first iterative process terminates when the update velocity model does not decrease a first surface data residual, and the second iterative process terminates when the update density model does not decrease a second surface data residual.

5. The method of claim 1, wherein the iterative process terminates when the update frequency is greater than a maximum frequency in the set of seismic data.

6. A non-transitory computer-readable medium storing instructions which, when executed, cause a computer system to perform operations comprising:
    receiving, by a data processing apparatus, a set of seismic data of a hydrocarbon reservoir;
    setting, by the data processing apparatus, an initial velocity model and an initial density model;

filtering the set of seismic data using a low-pass filter based on an initial frequency;
generating, by the data processing apparatus, wavefields of the hydrocarbon reservoir by using the filtered set of seismic data;
selecting, by the data processing apparatus, a spatial direction;
generating, by the data processing apparatus, a velocity gradient and a reflectivity gradient of the selected spatial direction based on the wavefields;
updating, by the data processing apparatus, a velocity model and a density model using the velocity gradient and the reflectivity gradient of the selected spatial direction; and
using an iterative process to update the velocity model and the density model, wherein the iterative process comprises a plurality of iterations, each of the plurality of iterations comprises generating an updated frequency based on a frequency step value and a previous frequency, and filtering the set of seismic data based on the updated frequency to generate an updated velocity gradient and an updated reflectivity gradient, and using the updated velocity gradient and the updated reflectivity gradient to update the velocity model and the density model.

7. The non-transitory computer-readable medium of claim 6, the operations further comprising:
selecting a second spatial direction;
generating, by the data processing apparatus, a second velocity gradient and a second reflectivity gradient of the second spatial direction; and
updating, the velocity model and the density model using the second velocity gradient and the second reflectivity gradient.

8. The non-transitory computer-readable medium of claim 6, wherein the updating the velocity model and the density model comprises:
using a first iterative process to update the velocity model, wherein the first iterative process comprises a first plurality of iterations, each of the first plurality of iterations comprises generating a velocity update step value, generating an updated velocity model based on the velocity update step value and the velocity gradient, and in each of the first plurality of iterations, the initial velocity model is replaced by the updated velocity model generated in a previous iteration; and
using a second iterative process to update the density model, wherein the second iterative process comprises a second plurality of iterations, each of the second plurality of iterations comprises generating a density update step value, generating a updated density model based on the density update step value and the reflectivity gradient, and in each of the second plurality of iterations, the initial density model is replaced by the updated density model generated in a previous iteration.

9. The non-transitory computer-readable medium of claim 8, wherein the first iterative process terminates when the update velocity model does not decrease a first surface data residual, and the second iterative process terminates when the update density model does not decrease a second surface data residual.

10. The non-transitory computer-readable medium of claim 6, wherein the iterative process terminates when the update frequency is greater than a maximum frequency in the set of seismic data.

11. A device, comprising:
at least one hardware processor; and
a non-transitory computer-readable storage medium coupled to the at least one hardware processor and storing programming instructions for execution by the at least one hardware processor, wherein the programming instructions, when executed, cause the at least one hardware processor to perform operations comprising:
receiving a set of seismic data of a hydrocarbon reservoir;
setting an initial velocity model and an initial density model;
filtering the set of seismic data using a low-pass filter based on an initial frequency;
generating wavefields of the hydrocarbon reservoir by using the filtered set of seismic data;
selecting a spatial direction;
generating a velocity gradient and a reflectivity gradient of the selected spatial direction based on the wavefields;
updating a velocity model and a density model using the velocity gradient and the reflectivity gradient of the selected spatial direction; and
using an iterative process to update the velocity model and the density model, wherein the iterative process comprises a plurality of iterations, each of the plurality of iterations comprises generating an updated frequency based on a frequency step value and a previous frequency, and filtering the set of seismic data based on the updated frequency to generate an updated velocity gradient and an updated reflectivity gradient, and using the updated velocity gradient and the updated reflectivity gradient to update the velocity model and the density model.

12. The device of claim 11, the operations further comprising:
selecting a second spatial direction;
generating, a second velocity gradient and a second reflectivity gradient of the second spatial direction; and
updating, the velocity model and the density model using the second velocity gradient and the second reflectivity gradient.

13. The device of claim 11, wherein the updating the velocity model and the density model comprises:
using a first iterative process to update the velocity model, wherein the first iterative process comprises a first plurality of iterations, each of the first plurality of iterations comprises generating a velocity update step value, generating an updated velocity model based on the velocity update step value and the velocity gradient, and in each of the first plurality of iterations, the initial velocity model is replaced by the updated velocity model generated in a previous iteration; and
using a second iterative process to update the density model, wherein the second iterative process comprises a second plurality of iterations, each of the second plurality of iterations comprises generating a density update step value, generating a updated density model based on the density update step value and the reflectivity gradient, and in each of the second plurality of iterations, the initial density model is replaced by the updated density model generated in a previous iteration.

14. The device of claim 13, wherein the first iterative process terminates when the update velocity model does not decrease a first surface data residual, and the second iterative process terminates when the update density model does not decrease a second surface data residual.

15. The device of claim 11, the operations further comprising:
   filtering the set of seismic data using a low-pass filter based on an initial frequency; and wherein the wavefields of the hydrocarbon reservoir are generated by using the filtered set of seismic data.

* * * * *